Oct. 12, 1948.  E. L. VIDAL ET AL  2,451,131
METHOD OF MAKING REINFORCED STRUCTURES
Original Filed Sept. 6, 1940  4 Sheets-Sheet 1
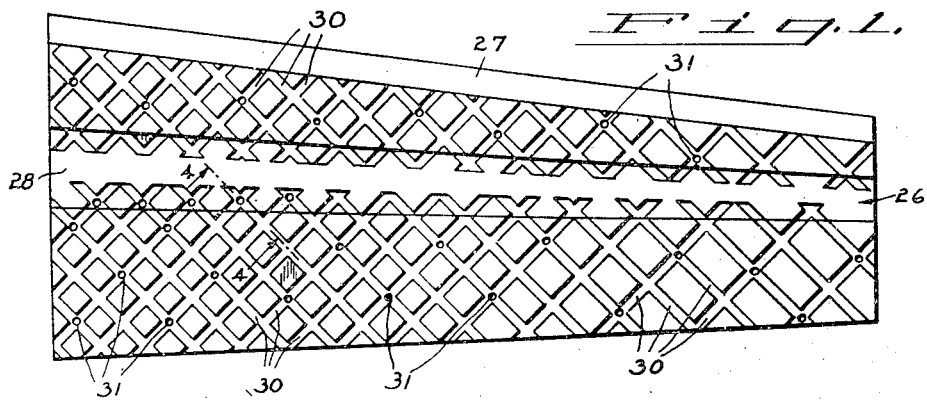
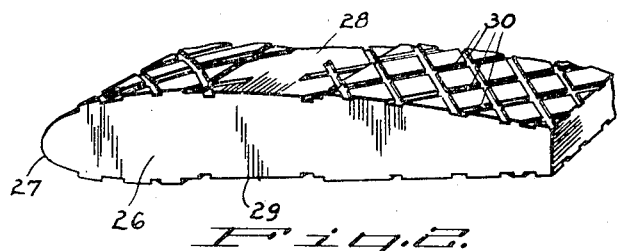
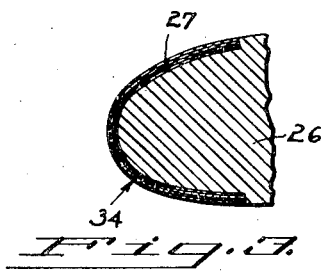
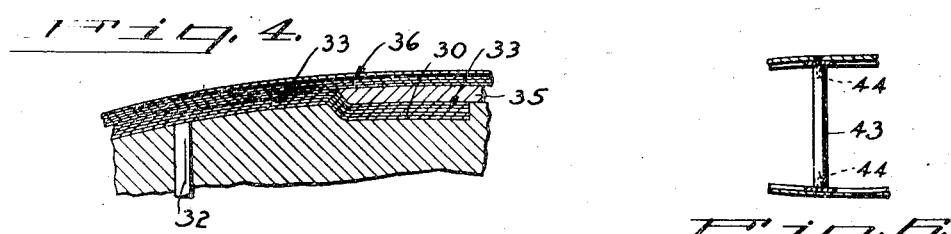
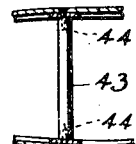
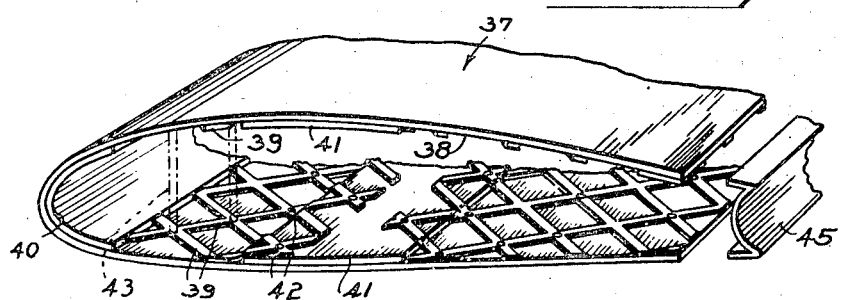
INVENTORS
Eugene L. Vidal and
BY Laurence J. Markhoefer
ATTORNEY

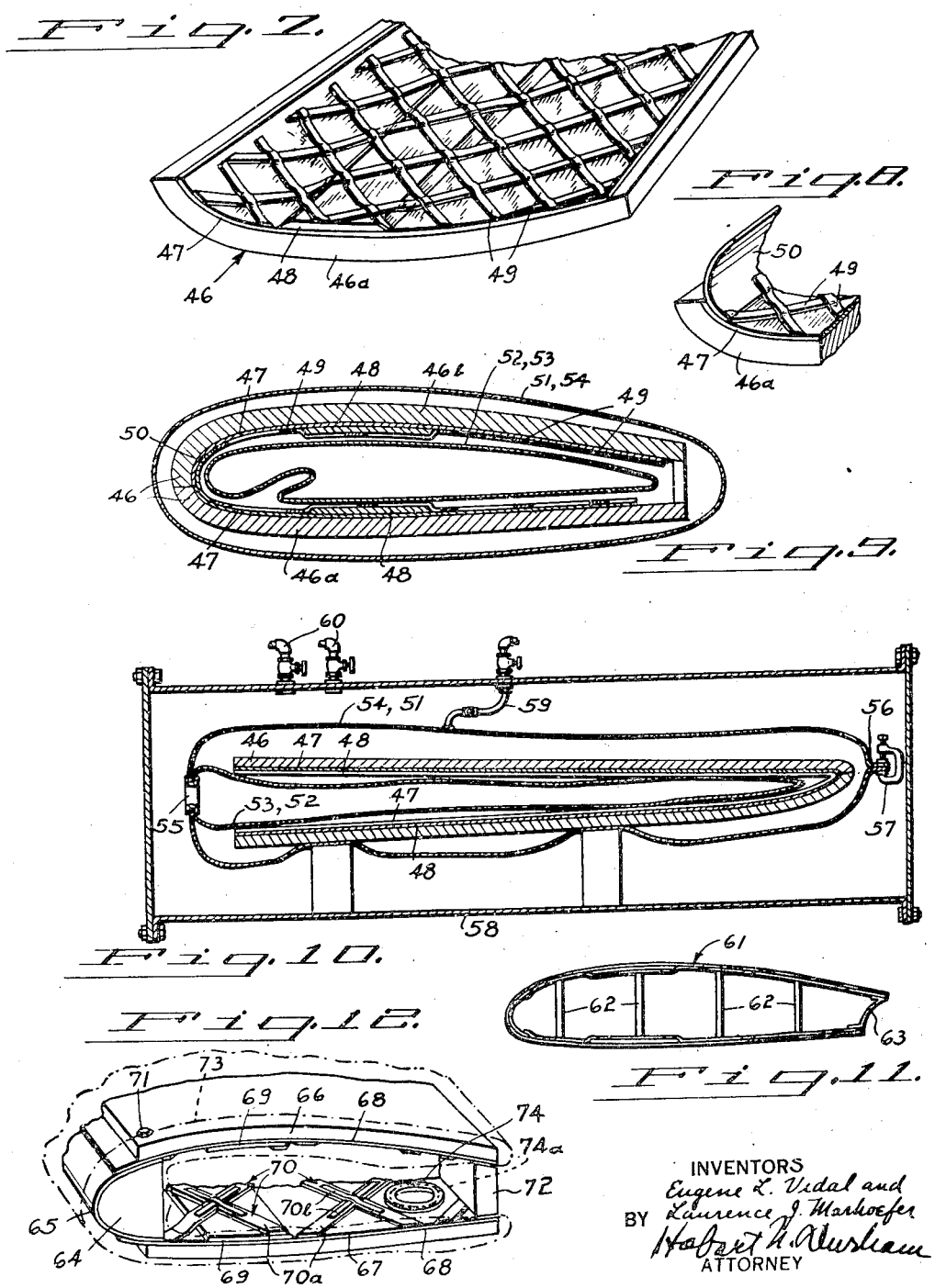

Oct. 12, 1948.   E. L. VIDAL ET AL   2,451,131
METHOD OF MAKING REINFORCED STRUCTURES
Original Filed Sept. 6, 1940                4 Sheets-Sheet 3

INVENTORS
Eugene L. Vidal and
BY Laurence J. Markhofer
Hobart N. Durham
ATTORNEY

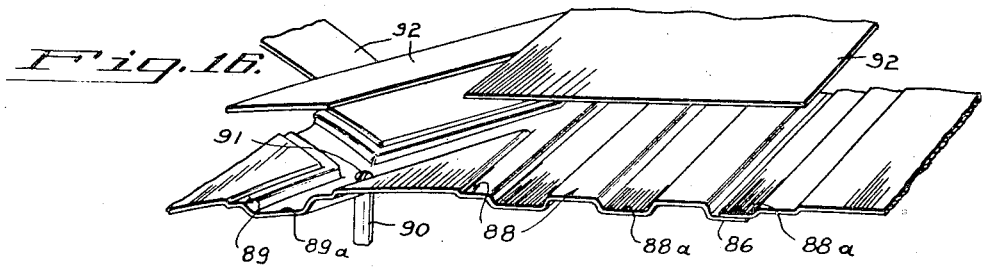
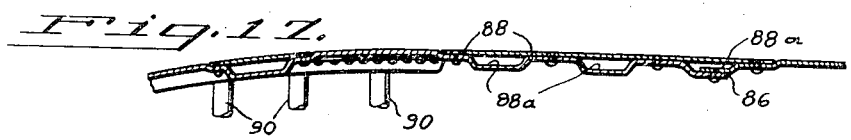
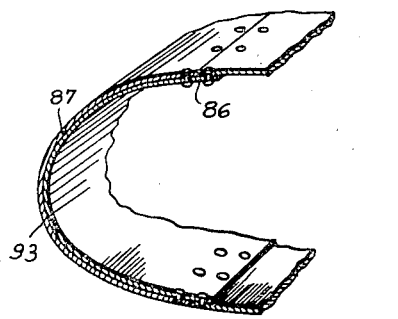
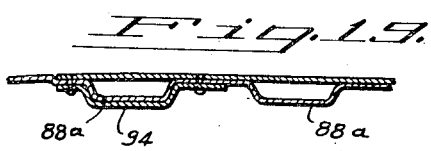
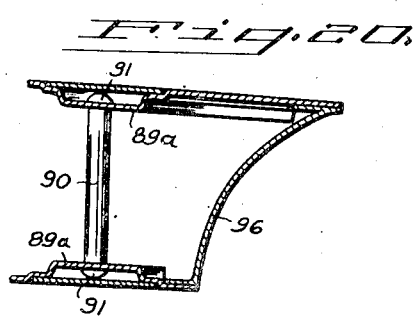
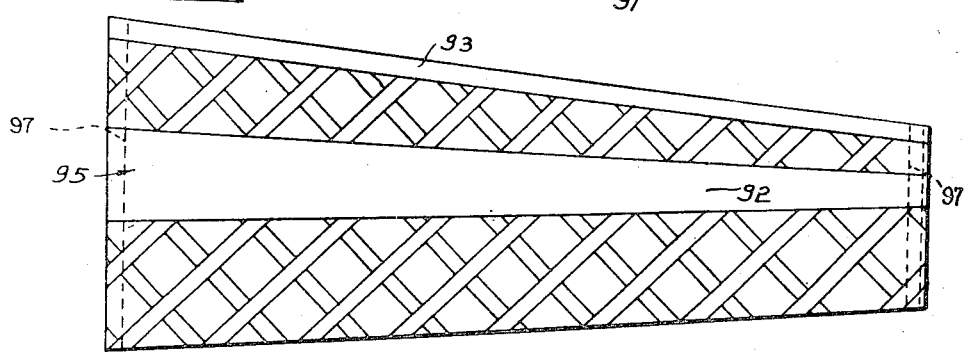

Patented Oct. 12, 1948

2,451,131

UNITED STATES PATENT OFFICE 2,451,131

METHOD OF MAKING REINFORCED STRUCTURES

Eugene L. Vidal, Washington, D. C., and Laurence J. Marhoefer, Haddon Heights, N. J., assignors to Vidal Corporation, Camden, N. J., a corporation of Delaware Original application September 6, 1940, Serial No. 355,554. Divided and this application November 11, 1943, Serial No. 509,846

2 Claims. (Cl. 154—110)

This invention relates to structures, such, for example, as airplane wings, fuselages, tail assemblies and controls, having a high strength-to-weight ratio, and to methods for making such structures.

It has heretofore been the practice to make hollow load carrying structures, such as aircraft wings, by first assembling with great care and accuracy a reinforcing framework consisting of longitudinal spars, stringers and transverse ribs, and thereafter attaching a skin material to said structure in a separate operation. The skin, particularly if fabricated from a rigid material, such as metal, for the purpose of increasing the structural strength of the wing, has to be formed and made in sections which are separately applied to the reinforcing structure. As a result, this method of wing manufacture is not adaptable for quantity production methods because of the many expensive steps necessary to produce from the many parts the finished product, and the fact that each of the steps must be carefully carried out by highly skilled employees working under constant supervision of experts in the art.

Accordingly, it is an object of this invention to provide a novel wing structure and a novel method of fabricating a substantial part of the skin and the reinforcing members of said structure in a single operation, thereby obviating the above production difficulties of prior methods.

A further object is to provide a novel method of manufacturing novel structural members, such as wings, fuselages, or aircraft controls, rapidly and economically, said members being of simple construction and consisting of a minimum number of parts.

Another object is to provide a novel structural member of great strength and rigidity and a novel method whereby said structural member can be readily formed and assembled.

Still another object is to provide a novel method of fabricating a hollow structure, such as an aircraft wing or control member, from sheet material.

A further object is to provide an aircraft section having novel reinforcing means formed therewith and secured thereto for increasing the strength and rigidity thereof.

A still further object is to provide a novel method of fabricating the above section from laminations of adhesively treated material.

Still another object is to provide a novel method of making reinforced aircraft sections from sheets of metal.

A still further object is to provide a novel reinforced aircraft wing having the skin thereof formed from sheet material.

The above and further objects and novel features of the invention will more fully appear from the following detailed description when the same is read in connection with the accompanying drawings. It is to be expressly understood, however, that the drawings are for the purpose of illustration only and are not intended to define the limits of the invention, reference being primarily had for this latter purpose to the appended claims.

In the drawings, wherein like reference characters refer to like parts throughout the several views, Fig. 1 is a top plan view of a mold upon which one embodiment of the present invention can be fabricated;

Fig. 2 is a view in perspective with parts broken away of the mold of Fig. 1;

Fig. 3 is an enlarged sectional view of a portion of said mold with moldable material positioned thereon;

Fig. 4 is an enlarged sectional view taken substantially along line 4—4 of Fig. 1, showing laminations of moldable material positioned on the mold;

Fig. 5 is a view in perspective with parts broken away of a wing section formed on the mold of Fig. 1;

Fig. 6 is a sectional view of a fragment of the above wing section illustrating the novel reinforcing structure provided therefor;

Fig. 7 is a perspective view with parts broken away of a part of another form of mold and of the manner in which moldable material is positioned thereon;

Fig. 8 is a view in perspective of a fragment of the mold part of Fig. 7, showing an additional reinforcing member positioned thereon;

Fig. 9 is a sectional view of the complete mold and apparatus for carrying out a step of a novel molding operation whereby the material on said mold is formed;

Fig. 10 is a sectional view of an apparatus adapted to carry out another step of the molding operation;

Fig. 11 is an end view of the wing section formed on the mold of Fig. 9;

Fig. 12 is a view in perspective with parts broken away of another form of mold and manner of locating moldable material thereon;

Fig. 16 is an exploded perspective view of a portion of the wing skin and the reinforcing material to be attached thereto;

Fig. 17 is a sectional view of a portion of the reinforced wing section;

Fig. 18 is a view in perspective of another portion of the reinforced wing;

Fig. 19 is a sectional view of a portion of the wing section illustrating an alternate method of reinforcing said section;

Fig. 20 is a transverse sectional view taken at the trailing edge of the wing section; and Fig. 21 is a top plan view of the completed wing section.

Figure 13:
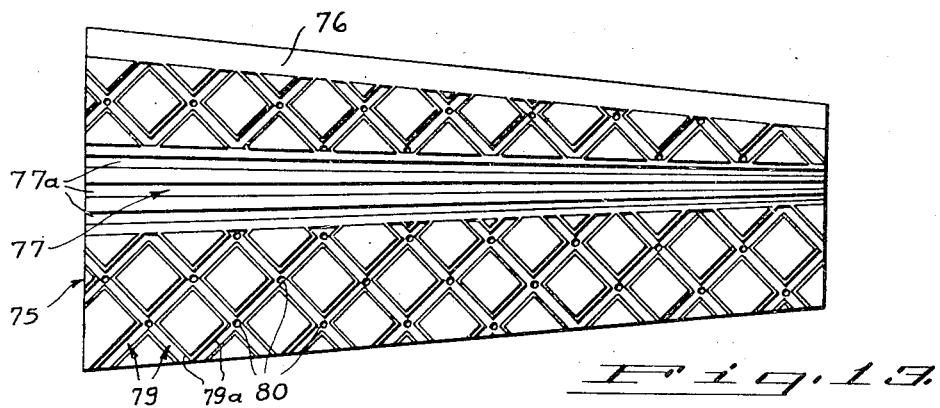
Fig. 13 is a top plan view of still another embodiment of a mold for fabricating a wing section according to the present invention.

The novel method comprehended by the present invention includes the steps of fabricating a hollow reinforced shell structure, such as a section of an aircraft wing, on a mold from laminations of sheet material and thereafter providing said shell structure with reinforcing members. A novel wing section is thus made which comprises a continuous shell or skin formed from sheet material and reinforced by a layer or layers of material secured to said skin, said layer or layers of material including spanwise extending elements and a lattice work of intersecting elements. The skin is additionally reinforced by a plurality of members adapted to extend between the upper and lower walls of the skin section.

A method embodying the novel steps of the present invention and adapted for making a novel wing section is illustrated, by way of example, in Figs. 1 to 6. As shown, the section is formed on a mold 26, said mold being adapted to produce the longitudinal portion of the wing between the tip piece and the fuselage and the entire transverse portion of the wing over this length except for the aileron and flap. It is to be understood that the following process could be utilized, for example, to fabricate the entire length of wing from tip to tip in a single unit including the ailerons and flaps, the latter being cut out after molding, reinforced if necessary, and then pivotally secured to the wing. Mold 26, which has an external surface conforming to the contour of the wing interior, is preferably provided with three longitudinal recesses or indentations 27, 28 and 29, recess 27 extending along the leading edge of said mold and recesses 28 and 29 being located in the upper and lower surfaces, respectively, of said mold intermediate the leading and trailing edges. A plurality of intersecting grooves 30 is provided in the spaces between indentations 27, 28 and 29, said grooves preferably terminating within the area occupied by recesses 28, 29 and along the edge of or within indentation 27. Grooves 30 are adapted to receive and form reinforcing members for the wing and accordingly the depth and the number of said grooves as well as the spacing thereof is determined by the desired strength and rigidity of the reinforcing lattice being formed in said grooves. The latter preferably intersect substantially at right angles and toward the tip of the wing may be spaced farther apart and may be of a lesser depth.

A plurality of openings 31 are provided at selected points in mold 26 and extend in a substantially vertical direction through said mold, preferably terminating on both sides of the mold at the intersection of grooves 30 (Figs. 1 and 2). These openings are provided for the purpose of receiving a plurality of elements 32 (Fig. 4) which are adapted to fill the openings and project beyond the surface of the mold on each side thereof and thus produce recesses on the interior of the molded structure facilitating the subsequent location of additional reinforcing members. A mark could also be produced for this purpose by leaving opening 31 unfilled in which event projections instead of depressions would be created on the interior of the molded structure.

The novel wing structure of the present invention when made on an inside mold, such as mold 26, is preferably formed from sheets of veneer, said mold being rendered non-adhesive, for example, by being coated with Cellophane or cellulose acetate, or by having the sides of the sheets in contact with said mold free of adhesive. Laminations of said veneer treated with a suitable adhesive are superposed to a desired thickness on the mold and then pressed to the desired shape while the adhesive is activated and caused to set. The veneer sheets are preferably treated with a thermoplastic or thermosetting adhesive and the treatment consists of coating and impregnating the sheets with said adhesive, for example, by dipping the sheets in the adhesive or by spraying or painting the latter on the sheets. The sheet may be seasoned for several hours after the adhesive is applied and the application may be repeated one or more times to improve the impregnation and coating of the sheets. A suitable plasticizer, such as dibutyl phthalate, can be mixed with the thermoplastic adhesive to make the impregnated sheets more flexible during molding, the quantity of plasticizer added to the thermoplastic varying inversely as the length of the radius of curvature of the shape into which the veneer sheets are to be formed.

With elements 32 properly positioned in openings 31, a plurality of treated veneer strips 33, that is, strips treated or coated with adhesive are located in grooves 30, said strips preferably forming butt joints at the intersections of said grooves. It will be understood that strips 33 could be positioned to successively overlap each other at the groove intersections, in which event the grooves would be cut deeper at these points, to provide room for the added material. Indentation 27 is filled with a plurality of laminations 34 of treated veneer (Fig. 3) and said laminations may be preformed to the desired shape and bonded together before being positioned in said indentation. Longitudinal stringers 35, coated with adhesive, are located in recesses 28 and 29 and, although preferably formed from solid pieces of material, may consist of a plurality of adhesively treated laminations of veneer. A plurality of treated veneer sheets 36 are superposed with grains extending in the direction to take the greatest stresses over the mold surfaces conforming to the wing contour to produce a desired thickness of material adapted to constitute the skin of the completed structure.

When the above-described structure is properly assembled on the mold in the above-described manner and the exposed surfaces are rendered non-adhesive, for example, by being coated with cellulose acetate, the assembly and the mold are subjected to a molding operation which includes the application of pressure whereby the laminations are caused to closely conform to the mold shape while the adhesive is actuated and caused to set. This is preferably accomplished by inserting the mold and the assembly thereon into a flexible, substantially impervious container and then placing said container into a pressure chamber wherein said container is preferably subjected to fluid pressure. The interior of the container is in communication with the exterior of the chamber so that the pressure in the latter will exhaust said container and cause the walls thereof to closely engage the laminations on the mold. The pressure is preferably applied by introducing compressed air and/or steam into the chamber, the steam or other heating medium being used when the laminations have been treated with thermoplastic or thermosetting adhesives and heat is desired for activating the adhesive. The pressure remains applied until the adhesive has set and then the mold and the structure molded thereon are removed from the chamber and from the container.

The molded wing section (Fig. 5) is removed from the mold by separating the upper and lower sides thereof at the trailing edge a sufficient distance to permit the withdrawal of said mold from the rear of finished wing section 37. The latter consists of a skin 38 reinforced by a layer of supporting elements attached to the face of said skin, said elements comprising a plurality of latticed strips 39, a nose stiffener 40 and spanwise stringers 41. These reinforcing members in effect thicken the skin in the sections thereof which require strengthening and it is to be understood that instead of three longitudinally extending members as constituted by stiffener 40 and stringers 41, one or more extra laminations of veneer could be utilized to form a single reinforcing or thickening section located in the nose portion of the wing. A plurality of recesses or indentations 42 formed by means of elements 32 at the intersections of said strips are adapted to receive the ends of a plurality of column-like members or posts 43 (Figs. 5 and 6), said posts being used where reinforcing is necessary. The latter are thus located between the upper and lower walls of wing section 37 and are secured to said wing section by suitable means, such as self-locking screws 44 (Fig. 6). Members 43 are preferably formed from a light material, such as Bakelite, and can be accurately fitted for the space occupied thereby by being used as elements 32 (Fig. 4) when section 37 is molded. A suitably shaped channel beam 45 molded by the above method is mechanically or adhesively secured at the trailing edge of section 37 in order to further strengthen said section, and the usual control members, i. e., a flap and an aileron (not shown), are operatively mounted to the rear of said beam. Instead of posts 43, suitable reinforcing means, such as a longitudinally extending channel beam, could be utilized. Furthermore, it is possible to produce the reinforcing latticework for the skin by locating skin laminations 36 on the mold first and then positioning strips 33 on said laminations over grooves 30. After molding, the portions of said strips which project beyond the skin surface can be sanded or otherwise removed to produce a smooth skin.

The above-described novel reinforced wing section 37 can also be formed on an outside mold, i. e., a mold conforming to the outer contour of the wing, and may be molded in one or several operations. An outside mold 46 for carrying out the fabrication of said section in a single molding operation is illustrated in Figs. 7 to 9 and, as shown, comprises two parts 46a and 46b, the former of which has the shape of the lower portion of said section, while the latter conforms to the upper portion, said section including the wing tip in this embodiment. Treated skin laminations 47 are superposed on the conforming surfaces of each of the mold parts, as, for example, on the upper surface of part 46a (Fig. 7), then treated longitudinal stringer 48 is located intermediate the leading and trailing edges to extend the length of the mold and finally a latticework of treated strips 49 is positioned on said laminations and said stringer, said strips being adapted to form overlapping joints at their intersections and to extend continuously over or under said stringer. The upper and lower portions of the wing section may be molded separately by inserting mold parts 46a, 46b and the structures assembled thereon separately into flexible containers and by carrying out the steps of a process similar to that for molding section 37 on inside mold 26, said portions being thereafter permanently joined either mechanically or adhesively.

It is preferable, however, to mold the wing section in a single operation and in order to accomplish this, it is desirable to temporarily secure the treated moldable material on mold parts 46a and 46b, as above described, and to place an adhesively treated reinforcing member 50 over skin laminations 47 (Fig. 8) at the leading edge of one of said mold parts, said member being formed from laminations of veneer and being adapted to project beyond the edge of said mold part and said laminations. Parts 46a and 46b are thereafter attached to each other to form hollow mold structure 46 having the moldable material positioned on the interior wall thereof. Member 50 is thus positioned to overlap skin laminations and to be lapped by the ends of strips 49 so as to form a strong joint at the leading edge of the finished wing section.

Fluid pressure is preferably applied to the moldable material to make the latter slide and conform to the shape of the mold 46 and this is accomplished in a novel manner adapted to minimize the stresses tending to deform the mold and thus make it possible to utilize a relatively light mold, thereby reducing the cost and facilitating the handling of the same. The mold and the assembly thereon are positioned in a substantially impervious chamber having an outer flexible wall or casing 51 (Fig. 9) adapted to engage the exterior of the mold and an inner flexible wall or casing 52 adapted to engage the laminations covering the interior of the mold. Fluid pressure is applied to the exterior of said chamber, which, in turn, causes pressures to be applied on both sides of the walls of the mold. These pressures oppose each other and set up a minimum amount of stress tending to deform the hollow mold. Thus it will be apparent that though deforming of the mold is minimized, the full pressure is utilized to press the moldable material into engagement with and to the shape of the mold.

In the illustrated embodiment, chamber 51, 52 (Fig. 10) consists of a pair of flexible containers 53 and 54, the former being positioned on the interior of the latter, and an opening 55 being common to both of said containers. The latter are connected along the edges of said opening so that only the interior of container 53 is accessible through said opening. An annular space is thus created between the exterior of said inner container and the interior of outer container 54, said space being adapted to receive hollow mold 46. The latter is inserted through an opening 56 in said outer container, closure means 57 being provided to seal said opening in order to render said chamber substantially airtight after the mold is positioned therein. It is to be understood that the same results could be obtained by using a single flexible container in which the mold is first positioned and then a portion of said container is inserted on the interior of the mold.

The fluid pressure is applied to chamber 51, 52 in a tank 58, said chamber being provided with a conduit 59 connecting the interior thereof to the exterior of said tank. It is preferable to exhaust said chamber either before the tank is closed or before the chamber is positioned therein in order to make possible a rearrangement of the chamber walls to eliminate undesirable wrinkles and an observation of the manner in which the laminations respond to pressure. Pressure is built up in tank 58, for example, by introducing compressed air or steam, or both, into said tank through passages 60, steam being preferably used together with compressed air when heat is required to activate the adhesive with which the laminations have been treated. A sufficient pressure is applied to give the laminations the shape of the mold, and said pressure is maintained until the adhesive has been activated and has set. The molded structure is then removed from the mold after the latter has been withdrawn from tank 58 and chamber 51, 52, this removal being facilitated by coating the mold surfaces and the outer laminations of the molded structure with a suitable nonadhesive, such as cellulose acetate.

Wing section 61 (Fig. 11), which is thus fabricated on mold 46, is further reinforced by a plurality of column-like members 62 which are secured to the skin preferably by self-locking screws (not shown) and said section has a channel beam 63 attached at the trailing edge, said beam, as shown, being preferably shaped to receive an aileron control member. Of course, the flap and aileron instead of being separately molded could be formed simultaneously with the main wing section as an integral part thereof, the flap and aileron portions of the molded unit being cut or otherwise removed from said unit and then mechanically attached thereto for pivotal movement.

Wing section 61 or a section similar thereto may also be fabricated in a novel manner on a mold assembly adapted to conform in part to the exterior of said section and in part to the interior of said section, as shown in Fig. 12. A mold portion 64 conforms to the interior of the nose of the wing section and nose 65 of said section is preformed on said mold portion to the desired thickness from a suitable number of laminations of adhesively treated veneer. Thereafter, a pair of outside mold portions 66 and 67 corresponding respectively to the upper and lower sides of said wing section have their conforming surfaces covered with adhesively treated skin laminations 68, longitudinal thickening members 69, and a lattice-work of reinforcing members or strips 70. The latter comprises relatively thick treated strips 70a, which are equal in length to the distance between centers of the lattice intersections and which form butt joints at each of said intersections and one or more strips of treated veneer 70b which overlap strips 70a at said intersections and strengthen the butt joints. Strips 70a are preferably about $\frac{1}{16}$" thick. Mold portions 66 and 67 are then attached to portion 64, preferably by means of a plurality of bolts 71 being supported in the desired spaced relationship by means of an end beam or block 72. Thus, mold portions 66 and 67 partly overlap portion 64 and skin laminations 68 overlap preformed nose 65. A flexible container 73, shown in broken lines, encompasses the interior and exterior of mold 64, 66, 67 and the laminations superposed on said mold by having the folds thereof located in the interior of said mold after the latter has been inserted in said container. The latter is provided with an air passage and performs the function of chamber 50, 51 when inserted in a pressure tank 58, said passage being connected to the exterior of said tank. Heat and pressure are preferably applied in tank 58 and a substantially unitary structure is molded which corresponds to the molded shell of section 61. The ends of laminations 68 which overlap nose 65 are thereafter sandpapered or otherwise partially removed so as to produce a smooth outer wing surface, and the section may be further reinforced by suitable longitudinal beams and/or column-like members.

Openings are usually required in the wing or other hollow structural section constructed in accordance with the above described methods in order, for example, to make the interior of the wing section accessible for the location of the aileron and flap control mechanisms and it is desirable that close-fitting covers or doors which conform to the outer contour of said section be provided for said openings. Accordingly, provision is made for the openings and the covers therefor during the molding of the structural section and the manner in which this is accomplished is illustrated, by way of example, in Fig. 12. The skin of the wing section is molded without the opening and the latter is thereafter cut out and the skin area thus removed constitutes the cover for said opening. To reinforce the edges of the openings and provide a frame or seat for the covers, it is desirable to mold an additional layer or layers of moldable material 74 on the interior of the wing section skin. This material covers boundary 74a of the proposed opening and extends on both sides thereof. To facilitate the ready removal of the skin section within boundary 74a of the opening, the portion of material 74 within said boundary is preferably separated from skin laminations 68 by a layer of nonadhesive material. Accordingly, after the wing section is molded, skin 68 thereof is cut along the boundary 74a to a depth equal to the skin thickness and the portion of said skin which is thus removed constitutes a cover for the resulting opening. Material 73 which is adhesively bonded to the interior of the skin along the edge of said opening has a portion thereof extending within said opening and the latter portion forms a seat for said cover. It is possible to build up portions of the wing for local or concentrated loads in the same way that the sill or seat for the cover of the opening is formed, i. e., by introducing additional layers of material at these portions. This process is particularly useful in preparing wing or wing section areas for metal fittings, for undercarriage reinforcing, for attachment to the fuselage or other wing sections, etc.

Figure 14:
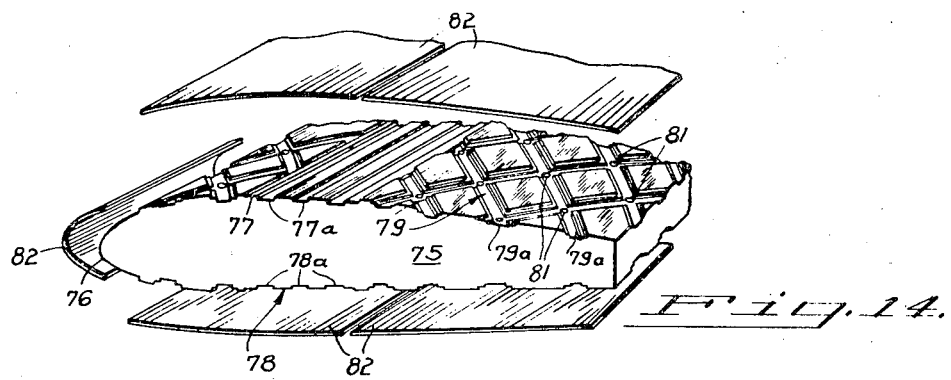
Fig. 14 is an exploded perspective view of a portion of the mold and the material to be formed on said mold.
Figure 15:
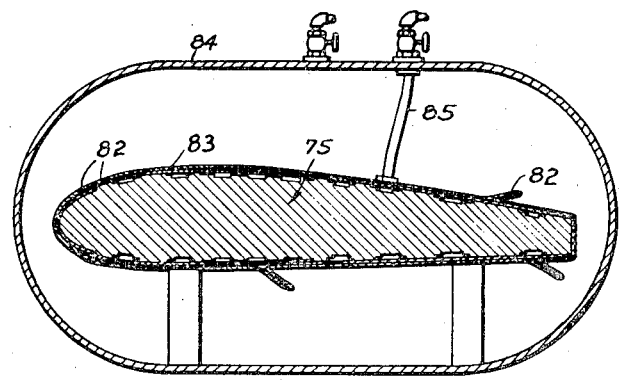
Fig. 15 is a transverse sectional view of apparatus adapted to carry out a step in the formation of an aircraft wing on the mold of Fig. 12.

Another form of wing structure embodying the novel features of laminated sections 37 and 61 which may be fabricated from sheet metal in accordance with the novel method of the present invention is illustrated together with the steps of forming said structure in Figs. 13 to 21. The method of fabrication is preferably carried out on an inside mold 75 having an indentation 76 in the leading edge thereof, a recess 77 extending the length of said mold and provided intermediate the leading and trailing edge in the top surface of the mold and a like recess 78 provided in the bottom surface (Fig. 14). A lattice of grooves 79 is provided in said mold and said grooves extend between the sides of said indentation and said recesses, and the trailing edge of said mold. The depth of said grooves, indentation and recesses is preferably equal to approximately a single thickness of the sheet metal from which the wing section is being formed. Each of grooves 79 is additionally centrally recessed so as to be provided with a central depression 79a preferably of a greater depth than the thickness of said sheet metal, and the bottom walls of grooves 79 constitute shoulders which border said depressions. Similarly, recesses 77 and 78 are provided with a plurality of longitudinal depressions 77a and 78a (Fig. 14), respectively, extending the length of said recesses. If desired, a plurality of openings 80 extending in a substantially vertical direction through the mold, preferably between the intersections of grooves 79 on each side of the mold, may be provided, said openings being adapted to be filled with members 81 (Fig. 14) which protrude a slight distance beyond the bottom walls of depressions 79a and produce recesses in the material formed on said mold. These recesses, as heretofore pointed out, constitute marks for positioning additional reinforcing members, it being understood that suitable marks can also be formed without filling openings 80, in which event the material formed on the mold will be provided with internal projections instead of depressions.

In order to form a metal shell or skin on mold 75, a plurality of sheets 82, for example, of aluminum, aluminum alloy or stainless steel, are superposed preferably in a single layer on said mold, adjacent sheets being positioned to overlap along their edges. It is possible to carry out the fabrication of the wing with a single sheet if the latter is commercially available, said sheet being roughly shaped to conform to the mold contour prior to being positioned thereon. It is also possible to make the wing from a single sheet formed by first welding or riveting a plurality of sheets of a commercially standardized width to each other. However, it is preferable to temporarily secure the separate sheets on the mold by suitable means, such a straps or elastic bands (not shown), and to permanently join said sheets after the same are shaped in the mold. In the illustrated embodiment, sheets 82 are adapted to overlap at indentations 76, 77 and 78.

The metal sheets are formed in a novel manner to the desired shape by being subjected to fluid pressure, and this is accomplished by inserting the mold and the sheet material thereon into a flexible, substantially impervious container 83, for example, of rubber or fabricated rubber, and then positioning said container and its contents in a pressure chamber 84. A passage 85 is preferably provided for connecting the interior of said container to the exterior of said chamber and a suitable medium, such as air or steam, is introduced into the chamber to raise the pressure therein and urge the metal sheets 82 into engagement with mold 75 to give said sheets a shape similar to that of the mold surfaces. It has been found satisfactory to employ a fluid pressure of from 25 to 50 lbs. per square inch above atmospheric to form sheets of stainless steel having a thickness of .035" on a mold provided with grooves and depressions having a maximum depth of ¾".

Sheets 82, after being molded in the above-described manner, are removed from chamber 84 and container 83 and permanently joined together along overlapping edges 86 by any suitable means, such as by being riveted as shown (Figs. 17 and 18) or by being welded. The resulting unitary structure comprises a shell having a longitudinal leading edge indentation 87 (Fig. 18), indentations 88 corresponding to recesses 77 and 78 in said mold, and grooves 89 corresponding to mold grooves 79, indentation 87 having been formed in the leading edge by positioning one of sheets 82 in indentation 76 and overlapping adjacent sheets 82 over both edges of said first sheet. Grooves 89 and indentations 88 are provided with corrugations 89a and 88a, respectively, said corrugations being formed by depressions 77a, 78a and 79a in said mold. Reinforcing posts 90, preferably of Bakelite and preferably used as members 81 during molding, are positioned in the recesses or other marks produced at the intersections of corrugations 89a, said posts being secured to the shell by suitable means, such as self-locking screws 91.

To further reinforce the shell and to produce a smooth streamlined airfoil surface, the indentations and grooves thereon are at least partially filled, preferably by metal strips 92 having the same thickness as said shell and secured thereto either by riveting or welding. A single strip is adapted to fill indentation 88 (Figs. 16 and 17) and separate strips are utilized for filling grooves 89, said strips being attached to the shoulders formed by the bottom walls of said indentation and said grooves, and therefore not filling corrugations 88a and 89a. A sheet 93 formed to the proper shape is positioned in indentation 87 Fig. 18). If additional strengthening is required, corrugations 88a or 89a can be reinforced by strips 94 (Fig. 19) adapted to be attached on the inside of the shell beneath said corrugations. After shell 95 (Fig 21) is thus fabricated and reinforced, a channel beam 96 (Fig. 20) having a shape suitable for permitting the pivotal mounting of a control member to the rear thereof is welded or riveted to said shell at the trailing edge.

Each of the hollow wing panels or sections constructed by the above-described methods can be further reinforced by chord-wise extending members or ribs 97 (Fig. 21), at least one of said ribs being preferably located at each end of a panel to provide torsional rigidity. These chordwise ribs may also be used in the vicinity of landing gear attachments or other portions of the wing that are adapted to take extra loads. It will be understood that the novel wing structure, which includes a lattice of reinforcing members, can be formed by other methods as, for example, by stamping or rolling the elements of a reinforcing lattice and mechanically securing said elements to each other and then providing a suitable skin for the lattice. The skin may be entirely formed from a single material, such as fabric or sheet metal, or partly from fabric and partly from metal.

There is thus provided a novel method for making a novel aircraft wing having a high strength-to-weight ratio and requiring neither expensive male and female metal dies nor preliminary assembly of a reinforcing framework prior to the fabrication of the skin thereof. The method which includes novel steps for fabricating sheet material, such as metal or veneer, into structural members of great strength and rigidity may be carried out readily and rapidly for producing large quantities of said members. A wing section having novel reinforcing means formed therewith is fabricated in a novel manner according to the above-described method and the latter includes novel steps for forming sheets of metal into a hollow structural member of great strength.

The present application is a division of our copending application Serial No. 355,554, filed September 6, 1940, now abandoned.

Although several embodiments of the present invention have been illustrated and described, it is to be expressly understood that the same is not limited thereto. For example, it will now be apparent to those skilled in the art that the novel method above-described could be utilized for making other hollow load carrying structures besides wings and wing sections, and that the reinforced structural elements which constitute said sections may be utilized in other devices. Furthermore, various changes may be made in the design and arrangement of the novel wing section without departing from the spirit and scope of the invention. For a definition of the limits of the invention, reference will be had primarily to the appended claims.

What is claimed is:

1. The method of molding a hollow structural member which includes the steps of superposing a plurality of adhesively treated laminations on the interior of a hollow mold having the contour of said member, positioning said mold with said laminations thereon between the inside and outside walls of a double-walled flexible container, said inside wall being adapted to engage the laminations covering the interior of the mold and said outside wall being adapted to engage the exterior of the mold applying fluid pressure to the outside of said container to cause the container walls to closely engage the mold and the laminations thereby forming the laminations to the desired shape, and activating the adhesive to cause the laminations to adhere to each other.

2. A method of fabricating a shell-like structural member on a mold which consists in superposing moldable material on the interior of a hollow mold conforming to the outside shape of the desired member, positioning said mold with said moldable material thereon between the inside and outside walls of a double-walled flexible container, said inside wall being adapted to engage the moldable material covering the interior of the mold and said outside wall being adapted to engage the exterior of the mold, and subjecting said container to fluid pressure to cause the moldable material to be formed to the mold shape.

EUGENE L. VIDAL.
LAURENCE J. MARHOEFER.

REFERENCES CITED

The following references are of record in the file of this patent:

UNITED STATES PATENTS

| Number | Name | Date |
|---|---|---|
| 633,430 | Crowden | Sept. 19, 1899 |
| 964,510 | Gleason | July 19, 1910 |
| 1,352,600 | Haskell | Sept. 14, 1920 |
| 1,658,008 | Raiche | Jan. 31, 1928 |
| 1,885,406 | Bechereau | Nov. 1, 1932 |
| 2,168,280 | Klemm | Aug. 1, 1939 |
| Re. 21,850 | Thomson | July 1, 1941 |
| 2,258,134 | Clark | Oct. 7, 1941 |
| 2,273,919 | Allward | Feb. 24, 1942 |
| 2,276,004 | Vidal | Mar. 10, 1942 |
| 2,298,132 | Johnson | Oct. 6, 1942 |
| 2,394,730 | Vidal et al. | Feb. 12, 1946 |

FOREIGN PATENTS

| Number | Country | Date |
|---|---|---|
| 479,839 | Great Britain | Feb. 8, 1938 |